Figure 1:
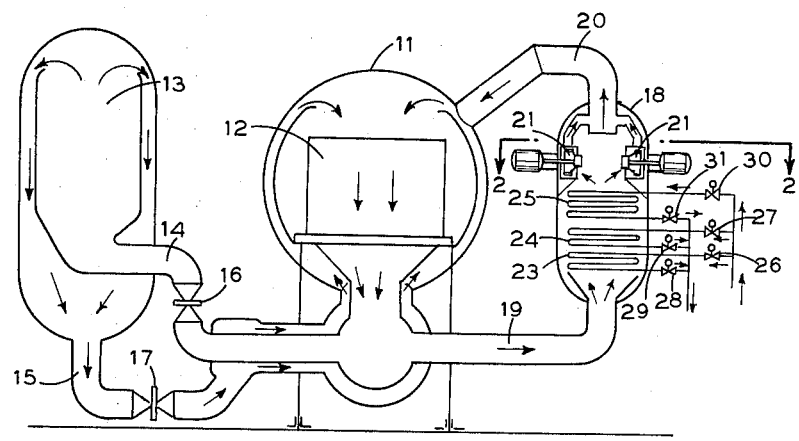

May 17, 1966

H. FRANKE ETAL 3,251,747

ARRANGEMENT FOR THE REMOVAL OF DECAY
HEAT FROM A NUCLEAR REACTOR

Filed Oct. 29, 1962

*INVENTORS*
Winfried Eming
Heinz Franke

BY

*ATTORNEY*

— 3,251,747 —
ARRANGEMENT FOR THE REMOVAL OF DECAY HEAT FROM A NUCLEAR REACTOR
Heinz Franke, Essen-Steele, and Winfried Eming, Essen-Ruttenschied, Germany, assignors to Babcock & Wilcox, Limited, London, England, a corporation of Great Britain
Filed Oct. 29, 1962, Ser. No. 233,817
Claims priority, application Germany, Nov. 7, 1961, D 37,402
10 Claims. (Cl. 176—60)

The present invention is directed to an arrangement for the removal of residual heat from a nuclear reactor and more particularly to an arrangement utilizing an inert gas as a coolant fluid for removing heat from the fuel elements and transfer to a secondary fluid.

It has been found that accidents may occur in a reactor system which may require the immediate shut-down of the reactor and at the same time the shut-down of the heat exchangers or steam generators normally utilized to remove the reactor heat. When a reactor is shut-down it is known that, as a result of the decay of certain products of the fission reaction occurring therein, large quantities of heat may be generated for an extended period after the shut-down of the reactor, which, if not properly removed from the system, could possibly damage the structure of the reactor. Several arrangements are known for removing the decay heat from a nuclear reactor based upon the utilization of a supplemental heat exchanger arranged exterior of the reactor which may be operated until the amount of decay heat has diminished to a safe level. While these decay heat removal systems have generally been reliable in operation, they have had the disadvantage of not being flexible enough to adapt to various operating conditions.

Accordingly, the present invention provides a decay heat removal system utilizing a supplemental heat exchanger adapted to operate at both the normal reactor operating pressure and at a lower pressure. Such a lower pressure operating condition could occur as a result of leaks in the reactor system. The circulation of the coolant fluid is provided by a plurality of pumps or blowers, for example four, which are disposed in a common horizontal plane of the vertically oriented, cylindrical supplemental heat exchanges. Should the reactor system be shut-down while remaining at the normal operating pressure, only two of the four blowers arranged for operation at this pressure would go into operation. The remaining blowers are adapted to operate at a lower pressure and are only used when such a reduced pressure is reached.

The present invention further provides a plurality of heat exchanger panels disposed therein and arranged to operate at separate and distinct capacities. Thus the heat exchanger panels are arranged so that the heat transfer capacity may be reduced by taking selected panels out of the circuit.

The present invention is further characterized by the fact that the blowers are disposed within the supplemental heat exchanger so that no differential motion compensators are required therefore.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Figure 2:
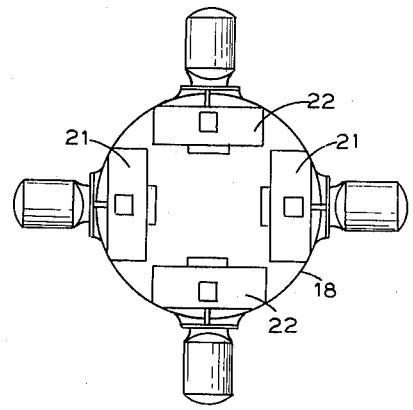

Of the drawings:
FIGURE 1 illustrates schematically a vertical section through the reactor arrangement of the present invention, and FIGURE 2 shows a horizontal cross section taken along line 2—2 of FIGURE 1.

A reactor 12 is arranged in a pressure vessel 11 and is connected to a steam generator 13 by lines 14 and 15. Valves or dampers 16 and 17 are provided in lines 14 and 15 respectively, to isolate the steam generator 13 in the course of normal operation or in the case of an accident.

The reactor is also connected to a supplemental heat exchanger 18, having walls forming a vertically elongated cylindrical pressure vessel, by lines 19 and 20. The supplemental heat exchanger is disposed externally of the reactor and contains two high pressure blowing systems 21 as well as two low pressure blowing systems 22 all of which are arranged in the upper portion of the supplemental heat exchanger. A plurality of heat exchange panels used to absorb the decay heat from the shut-down reactor are disposed in the lower portion of the supplemental heat exchanger. A portion of the tubes, namely 23 and 24, with their associated cut off valves 26, 27, 28, and 29 are used primarily for high pressure operation, i.e., when the normal reactor operating pressure is maintained after the reactor is shut down. The remaining tube panel 25 is operated in conjunction with tube panels 23 and 24 when low pressure operation is necessary. The secondary cooling fluid enters the lower tube panels through valves 26 and 27 and leaves via valves 28 and 29. The corresponding valves 30 and 31 are provided for the upper tube panel 25.

During normal reactor operation steam generator 13 is the only one operated. During this normal operation only very slight amounts of coolant fluid are by-passed through the supplemental heat exchanger 18 maintaining this at the same operating temperature so that it may be placed into service at any time without the possibility of thermal shock of the components therein upon start-up. Should an accident occur to the reactor system causing either the reactor or the normal heat exchanger to be taken out of operation, the entire residual or decay heat is absorbed in the supplemental heat exchanger by passing the entire flow of coolant fluid therethrough. If the reactor system remains intact so that normal operating pressures may be maintained, only the high pressure blowers 21 need be utilized to circulate the coolant fluid through the tube panels which absorb the heat generated within the reactor 12. Thus heat absorbtion will take place in the lower tube panel 23 while the remaining panels 24 and 25 are maintained primarily for reserve capacity. Should some failure take place causing panel 23 to be taken out of operation, continued decay heat cooling may be maintained by utilizing panels 24 and 25.

Should the blowers of the primary steam generator 13 fail, the supplemental heat exchanger 18 would operate as above. Valves 16 and 17 and ducts 14 and 15 of the heat exchanger 13 should be shut and the entire flow of coolant fluid would be through supplemental heat exchanger 13.

In case a leak should occur in the reactor system, whereby it would either be impossible to maintain the normal operating pressure or would be undersirable since to so do would increase the amount of coolant lost from the system, the supplemental heat exchanger would operate as follows. One of the low pressure pumps 22 would be operated to circulate the coolant fluid through the reactor to remove the decay heat therefrom and through the supplemental heat exchanger 18. With this type of operation all of the tube panels 23, 24, and 25 would be utilized in order to provide sufficient heat transfer surface to remove the amount of decay heat generated by the reactor. Safety considerations would require that only one of these low pressure pumps be utilized with the other being held in reserve.

By the arrangement of the present invention, the operating range of the supplemental heat exchanger has been extended to cover various operating pressures and represents an advantage since the factor of safety against decay heat damage to the reactor is maximized. Each component is provided with a corresponding reserve unit and provisions are made for operating the supplemental decay heat removal heat exchanger at various operating pressures. The incorporation of a large number of heat exchange panels therein makes it possible to remove the necessary quantity of heat even when the coolant fluid is operated under lower than normal pressures whereby a lesser amount of heat exchange surface would not satisfactorily remove all of the heat generated.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A heat exchanger for removing decay heat from a nuclear reactor, said heat exchanger comprising walls forming a vertically elongated cylindrical pressure vessel, a first pumping means for passing a coolant fluid serially through said reactor and said pressure vessel at the reactor operating pressure, a second pumping means for passing said coolant fluid through siad pressure vessel at a pressure lower than said reactor operating pressure, a plurality of heat exchange panels arranged in said pressure vessel for the passage of a heat absorbing fluid therethrough, and means for passing said heat absorbing fluid through a portion of said heat exchange panels during operation of said first pumping means and through all of said heat exchange panels during operation of said second pumping means.

2. A heat exchanger for removing decay heat from a nuclear reactor, said heat exchanger comprising walls forming a vertically elongated cylindrical pressure vessel, a first pumping means for passing a coolant fluid serially through said reactor and said pressure vessel at the reactor operating pressure, a second pumping means for passing said coolant fluid through said pressure vessel at a pressure lower than said reactor operating pressure, a plurality of heat exchange panels arranged in said pressure vessel for the passage of a heat absorbing fluid therethrough, and means for passing said heat absorbing fluid through a portion of said heat exchange panels during operation of said first pumping means and through all of said heat exchange panels during operation of said second pumping means, said pumping means disposed in said pressure vessel in a common horizontal plane above said heat exchange panels, said pumping means extending through and supported by said pressure vessel wall.

3. A heat exchanger for removing decay heat from a nuclear reactor, said heat exchanger comprising walls forming a vertically elongated cylindrical pressure vessel, a first pumping means for passing a coolant fluid serially through said reactor and said pressure vessel at the reactor operating pressure, a second pumping means for passing said coolant fluid through said pressure vessel at a pressure lower than said reactor operating pressure, a plurality of heat exchange panels arranged in said pressure vessel for the passage of a heat absorbing fluid therethrough, and means for passing said heat absorbing fluid through a portion of said heat exchange panels during operation of said first pumping means and through all of said heat exchange panels during operation of said second pumping means, said pumping means disposed in said pressure vessel in a common horizontal plane above said heat exchange panels, said pumping means extending through and supported by said pressure vessel wall, and a drive means associated with each of said pumping means and directly connected through said pressure vessel wall.

4. A method of operating a heat exchanger for the removal of decay heat from a nuclear reactor where said heat exchanger comprises a pressure vessel having a high and low pressure pumping means and a plurality of heat exchange panels disposed therein, comprising the steps of operating one of said pumping means to pass a coolant fluid through said pressure vessel, passing a heat absorbing fluid through a portion of said heat exchange panels when said high pressure pumping means is operated, and passing a heat absorbing fluid through all of said heat exchange panels when said low pressure pumping means is operated.

5. A nuclear power plant comprising a nuclear reactor arranged to operate at a given pressure, a heat exchanger arranged to remove heat from said reactor, means for passing a coolant fluid through said nuclear reactor absorbing heat therefrom, means for then passing said coolant fluid to said heat exchanger, means in said heat exchanger for removing the major portion of heat absorbed in said reactor during normal operation of said plant, a supplemental heat exchanger arranged in parallel flow relationship with said first heat exchanger, means for passing said coolant fluid through said supplemental heat exchanger at said given pressure, means for passing said coolant fluid through said supplemental heat exchanger at a lower pressure when said first heat exchanger is inoperative, and a plurality of heat exchange panels arranged in said supplemental heat exchanger to remove heat from said coolant fluid.

6. A nuclear power plant comprising a nuclear reactor arranged to operate at a given pressure, a heat exchanger arranged to remove heat from said reactor, means for passing a coolant fluid through said nuclear reactor absorbing heat therefrom, means for then passing said coolant fluid to said heat exchanger, means in said heat exchanger for removing the major portion of heat absorbed in said reactor during normal operation of said plant, a supplemental heat exchanger arranged in parallel flow relationship with said first heat exchanger, means for passing said coolant fluid through said supplemental heat exchanger at said given pressure, means for passing said coolant fluid through said supplemental heat exchanger at a lower pressure when said first heat exchanger is inoperative, and a plurality of heat exchange panels arranged in said supplemental heat exchanger to remove heat from said coolant fluid when said first heat exchanger is inoperative.

7. A nuclear power plant comprising a nuclear reactor arranged to operate at a given pressure, a heat exchanger arranged to remove heat from said reactor, means for passing a coolant fluid through said nuclear reactor absorbing heat therefrom, means for then passing said coolant fluid to said heat exchanger, means in said heat exchanger for removing the major portion of heat absorbed in said reactor during normal operation of said plant, a supplemental heat exchanger arranged in parallel flow relationship with said first heat exchanger, means for passing a small portion of said coolant fluid through said supplemental heat exchanger at said given pressure to maintain said supplemental heat exchanger at the operating temperature of said plant during normal operation of said plant, means for passing said coolant fluid through said supplemental heat exchanger at said given pressure, means for passing said coolant fluid through said supplemental heat exchanger at a lower pressure when said first heat exchanger is inoperative, and a plurality of heat exchange panels arranged in said supplemental heat exchanger to remove heat from said coolant fluid.

8. A nuclear power plant comprising a nuclear reactor arranged to operate at a given pressure, a heat exchanger arranged to remove heat from said reactor, means for passing a coolant fluid through said nuclear reactor absorbing heat therefrom, means for then passing said coolant fluid to said heat exchanger, means in said heat exchanger for removing the major portion of heat absorbed in said reactor during normal operation of said plant, a supplemental heat exchanger arranged in parallel flow relationship with said first heat exchanger, means for passing a small portion of said coolant fluid through said supplemental heat exchanger at said given pressure to maintain said supplemental heat exchanger at the operating temperature of said plant during normal operation of said plant, means for passing said coolant fluid through said supplemental heat exchanger at said given pressure, means for passing said coolant fluid through said supplemental heat exchanger at a lower pressure when said first heat exchanger is inoperative, and a plurality of heat exchange panels arranged in said supplemental heat exchanger to remove heat from said coolant fluid, a portion of said heat exchanger panels being arranged to operate independently of said other panels.

9. A nuclear power plant comprising a nuclear reactor arranged to operate at a given pressure, a heat exchanger arranged to remove heat from said reactor, means for passing a coolant fluid through said nuclear reactor absorbing heat therefrom, means for then passing said coolant fluid to said heat exchanger, means in said heat exchanger for removing the major portion of heat absorbed in said reactor during normal operation of said plant, a supplemental heat exchanger arranged in parallel flow relationship with said first heat exchanger, means for passing a small portion of said coolant fluid through said supplemental heat exchanger at said given pressure to maintain said supplemental heat exchanger at the operating temperature of said plant during normal operation of said plant, a first pumping means for passing said coolant fluid through said supplemental heat exchanger at said given pressure, a second pumping means for passing said coolant fluid through said supplemental heat exchanger at a lower pressure when said first heat exchanger is inoperative, a plurality of heat exchange panels arranged in said supplemental heat exchanger to remove heat from said coolant fluid, and means for passing a heat absorbing fluid through selected heat exchange panels when said first pumping means is employed and through all of said heat exchange panels when said second pumping means is employed.

10. A nuclear power plant comprising a nuclear reactor arranged to operate at a given pressure, a heat exchanger arranged to remove heat from said reactor, means for passing a coolant fluid through said nuclear reactor absorbing heat therefrom, means for then passing said coolant fluid to said heat exchanger, means in said heat exchanger for removing the major portion of heat absorbed in said reactor during normal operation of said plant, a supplemental heat exchanger having wall means forming a vertically elongated cylindrical pressure vessel arranged in parallel flow relationship with said first heat exchanger, means for passing a small portion of said coolant fluid through said supplemental heat exchanger at said given pressure to maintain said supplemental heat exchanger at the operating temperature of said plant during normal operation of said plant, a first pumping means for passing said coolant fluid through said supplemental heat exchanger at said given pressure, a second pumping means for passing said coolant fluid through said supplemental heat exchanger at a lower pressure when said first heat exchanger is inoperative, and a plurality of heat exchange panels arranged in said supplemental heat exchanger to remove heat from said coolant fluid, and means for passing a heat absorbing fluid through selected heat exchange panels when said first pumping means is employed and through all of said heat exchange panels when said second pumping means is employed, said pumping means being disposed through said pressure vessel wall in a common plane transverse to said pressure vessel.

References Cited by the Examiner
UNITED STATES PATENTS

| | | | |
|---|---|---|---|
| 2,815,321 | 12/1957 | Wigner | 204—193.2 |
| 2,816,068 | 12/1957 | Ruano | 204—193.2 |
| 2,841,545 | 7/1958 | Zinn | 204—193.2 |
| 2,961,393 | 11/1960 | Monson | 204—193.3 |
| 3,070,536 | 12/1962 | Taylor et al. | 204—193.2 |
| 3,127,322 | 3/1964 | Dodd | 176—38 |

FOREIGN PATENTS 906,096   9/1962   Great Britain.

OTHER REFERENCES

Nuclear Power, April 1958, page 170.
Nuclear Power, April 1960, pages 119 and 120.

REUBEN EPSTEIN, *Primary Examiner.*

CARL D. QUARFORTH, *Examiner.*

J. V. MAY, *Assistant Examiner.*